[11] 3,756,718
[45] Sept. 4, 1973

[54] COLOR PRINTER

[75] Inventor: Edward K. Letzer, Rochester, N.Y.

[73] Assignee: Eastman Kodak Company, Rochester, N.Y.

[22] Filed: Mar. 29, 1972

[21] Appl. No.: 239,152

[52] U.S. Cl............................ 355/32, 355/4, 355/88
[51] Int. Cl. ............................................. G03b 27/32
[58] Field of Search............................ 355/4, 32, 88; 96/1.2

[56] References Cited
UNITED STATES PATENTS

| | | | |
|---|---|---|---|
| 3,292,486 | 12/1966 | Mey | 355/4 |
| 2,986,466 | 5/1961 | Kaprelian | 96/1 |
| 3,531,195 | 9/1970 | Tanaka | 96/1.2 |
| 3,607,256 | 9/1971 | Silverberg | 96/1.2 |
| 3,627,408 | 12/1971 | Fergason | 353/84 |

*Primary Examiner*—John M. Horan
*Attorney*—W. H. J. Kline et al.

[57] ABSTRACT

Photofinishing production of prints from positive photographic original transparencies such as color slides is accomplished by recording the pictorial information from the photosensitive photographic original transparency in three primary colors on three electro-optical temporary image forming and storing devices, then additively projecting corresponding color separation images of the three temporary images stored by the temporary image forming devices onto conventional color printing paper or film. The temporary image forming devices may each consist of a photoconductor liquid crystal sandwich structure in which each temporary image is formed in response to a first voltage potential applied to each of the sandwich structures during the interval in which the pictorial information on the positive photographic original transparency is recorded. After exposure of the photosensitive print material is completed, the temporary images may be erased by applying a second voltage potential to the photoconductor liquid crystal sandwich structures.

12 Claims, 3 Drawing Figures

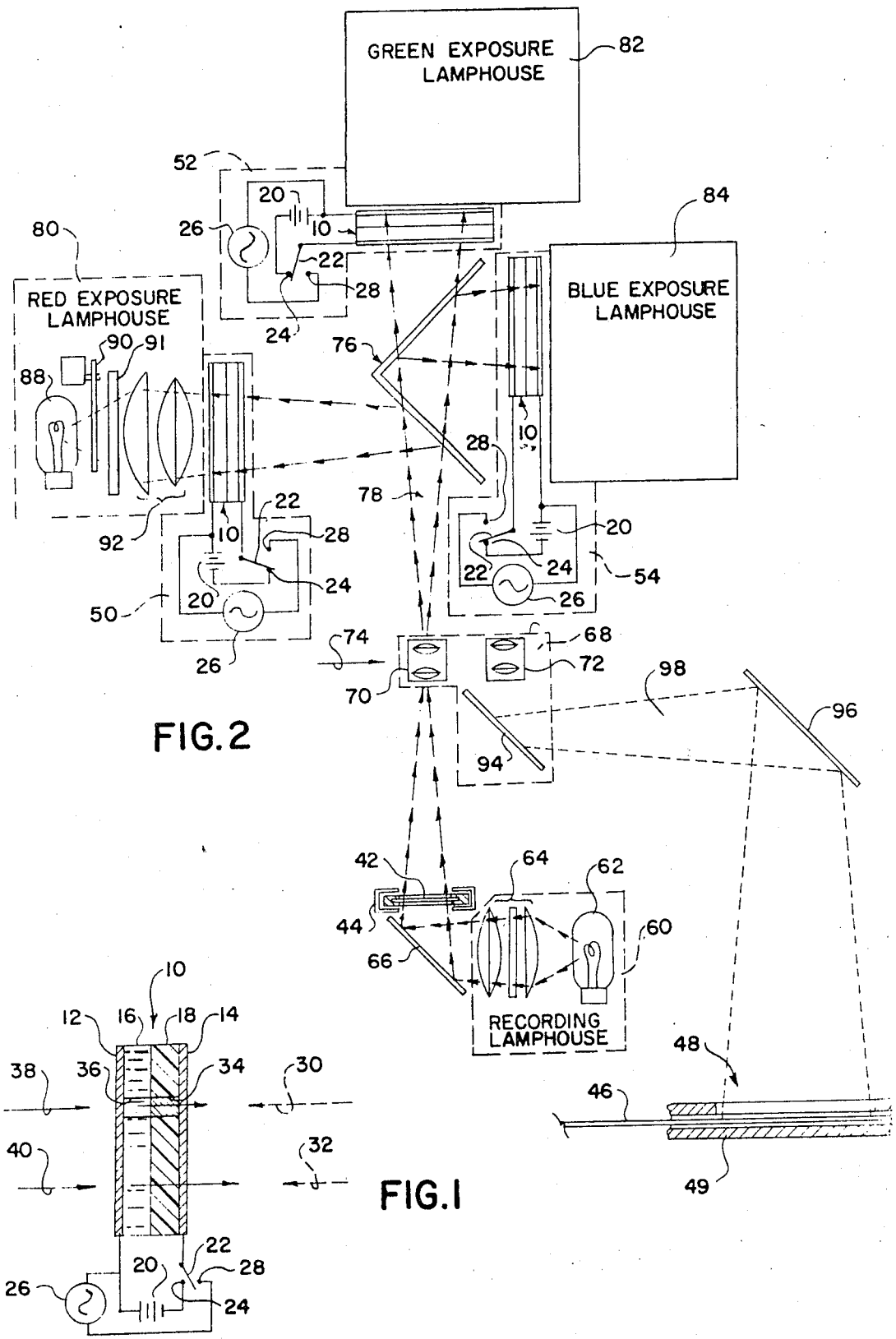

COLOR PRINTER

CROSS REFERENCE TO RELATED APPLICATION

Reference is made to commonly assigned copending U.S. application Ser. No. 81,960 filed Oct. 19, 1970, entitled MASKING PRINTER, now continuation application Ser. No. 262,854 filed June 14, 1972, and to commonly assigned copending U.S. application Ser. No. 239,061, filed on even date herewith, and entitled COLOR ANALYZING PHOTOGRAPHIC PRINTER, both to Edward K. Letzer, and to commonly assigned copending U.S. application Ser. No. 151,342, filed June 9, 1971, entitled MICROFILM CAMERA to Jone E. Morse, now continuation application Ser. No. 279,572 filed Aug. 10, 1972.

BACKGROUND OF THE INVENTION

1. Field of the Invention

In accordance with this invention, color printing method and apparatus are provided for producing photographic prints on photosensitive photographic print material without the production of an internegative from a positive photographic original transparency or without the necessity of reversal color processing of the photosensitive photographic print material.

2. Description of the Prior Art

Photofinishing production of prints on photosensitive photographic print material from positive photographic original transparencies, such as color slides, is currently accomplished by two different printing and processing methods. One method of producing a positive print from a positive color transparency comprises filtered white light exposure of a reversal type color print paper with subsequent reversal color processing of the paper. This first method is disclosed in greater detail in the publication entitled PHOTOGRAPHIC CHEMISTRY written by George T. Eaton and published by Morgan & Morgan, 1965.

The second method of producing a positive print from a positive color transparency involves exposing and processing an internegative from an original and then printing the internegative on conventional color printing paper with subsequent normal developement of the paper. In this second method, the internegative is produced by exposure of color negative photographic film to the pictorial information or other original image on the color transparency and subsequent color development of the image on the internegative. This second method is described in greater detail in the aforementioned *Photographic Chemistry*.

The above two methods for producing a color print from a positive color transparency both differ from the normal method of producing a color print from a negative color transparency, and although production of positive color prints from positive color transparencies constitutes but a minor portion of the color photofinishing business of a photofinisher, the photofinisher is required to maintain a low volume, high cost photofinishing operation suitable for practicing one of the two methods described above. The exposure and development of an internegative from each positive color transparency constitutes an obvious loss of both time and material. On the other hand, providing for the use of both conventional and reversal color print paper, requires separate color printers filled with the respective photographic papers and separate color processing of each of the photographic papers, involving higher expenditures for equipment and materials than would be necessary if both positive and negative color transparencies could be printed on the same photosensitive printing paper.

SUMMARY OF THE INVENTION

Accordingly, it is an object of the present invention to provide a printing method and apparatus for producing positive prints of photographic original transparencies on photosensitive material without the necessity of exposing and processing an internegative of the original image.

Likewise, it is an object of the present invention to provide a printing method and apparatus for producing positive copies of positive photographic original transparencies on photosensitive photographic color print material without the production of an internegative of the positive photographic original transparency and without subsequent reversal color processing of the photosensitive photographic color print material.

It is also an object of the present invention to provide a printing method and apparatus for printing positive photographic original transparencies on photosensitive photographic color print material through the use of temporary image forming and storing devices.

Furthermore, it is an object of the present invention to provide a printing method and apparatus for printing positive photographic original transparencies on photosensitive photographic color print material through the use of electrooptical temporary image forming and storing devices comprising liquid crystal and photoconductive materials.

In accordance with these and other objects of the present invention, photographic printing methods and apparatus are disclosed herein in which pictorial or other information on an original is projected onto photosensitive material thorugh illumination of the pictorial information on the original with at least first and second wavelengths of radiation, exposing at least first and second electro-optical image forming and storing devices to the first and second wavelengths of radiation, to store respective first and second temporary images and projection of the first and second wavelengths of radiation through the first and second temporary images and upon photosensitive material. The photosensitive material may then be processed to produce a positive print of the pictorial information on the original.

More particularly, the first and second electrooptical image forming and storing devices may be a photoconductor liquid crystal sandwich structure of the type having the capacity to respond to illumination and a first electrical signal to store an image at least temporarily after which the stored image may be erased by application of a second electrical signal thereto.

Among the advantages of the photographic printing method and apparatus of the present invention is that no time or material is lost in processing an internegative of the original image or in reversal processing of photosensitive material. The electro-optical image forming and storing devices described above may be reused indefinitely after each erasure of the temporary images formed thereby, and the time that it takes to form and erase a temporary image is extremely short.

Furthermore, the photosensitive material may be photographic color print material, and it may be processed and developed along with photosensitive color print material exposed to color negatives.

BRIEF DESCRIPTION OF THE DRAWINGS

FIG. 1 is an enlarged section through a photoconductive liquid crystal sandwich structure and associated electrical circuit constituting an electro-optical image forming device employed in FIGS. 2 and 3;

FIG. 2 is a side elevation of a color printer constructed in accordance with this invention, with parts in section for clarity of illustration, operative in a first mode for forming temporary images in electro-optical image forming devices.

DESCRIPTION OF THE PREFERRED EMBODIMENT

Figure 3:
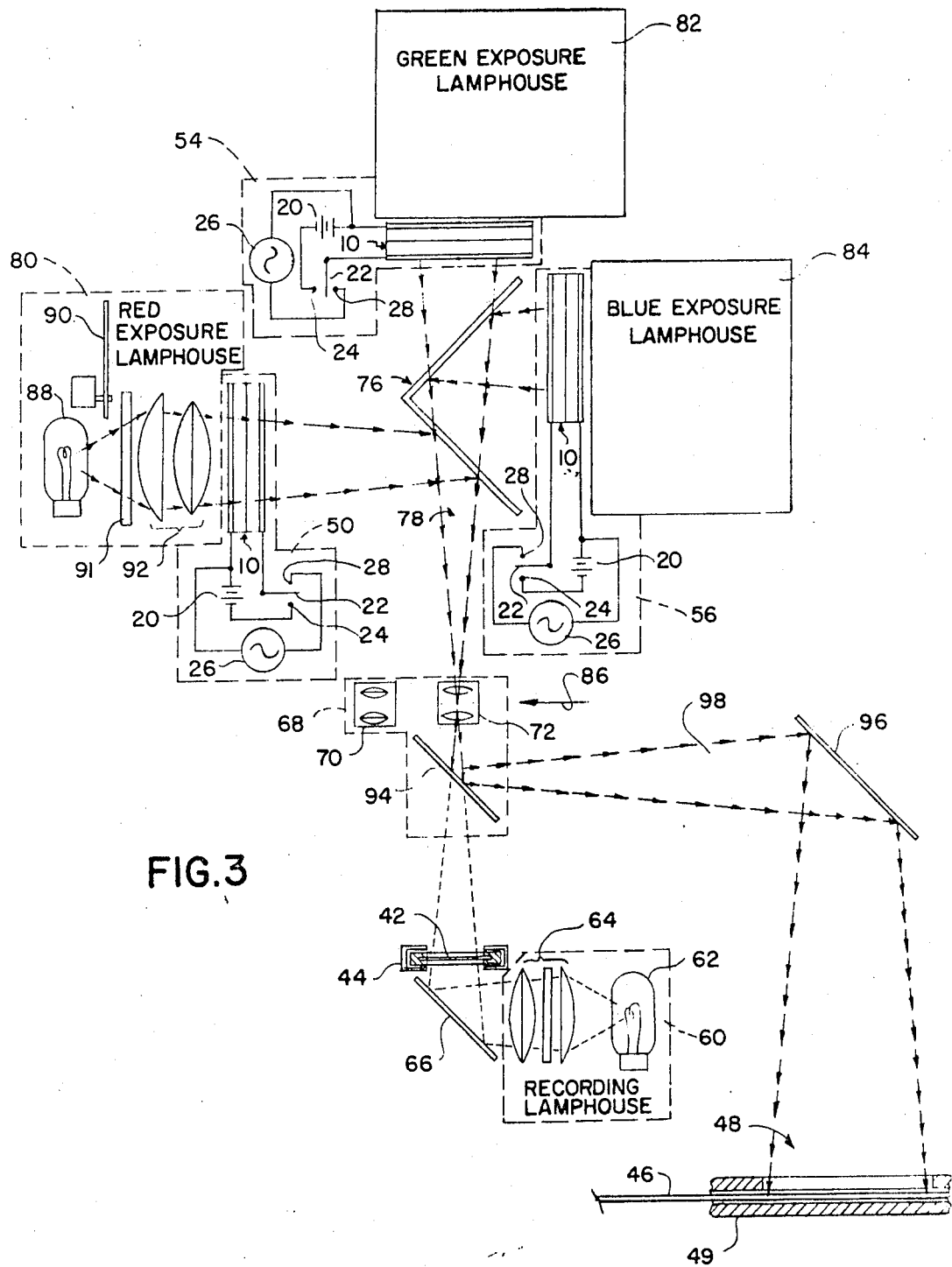
FIG. 3 is a side elevation of the color printer of FIG. 2 operative in a second mode for projecting the temporary images in the electro-optical image forming devices onto photosensitive photographic print material.

As stated hereinbefore, my invention involves a method and apparatus for printing originals on photosensitive material through the use of temporary image forming and storing devices. Before describing in detail the particular color printer, shown in FIGS. 2 and 3 of the preferred embodiment of the invention, a description of the temporary image forming and storing device of FIG. 1 is in order.

In FIG. 1 there is shown an enlarged cross-section through a photoconductor liquid crystal sandwich structure 10 and associated electrical circuit constituting an electro-optical image forming device of the same type shown and described in the aforementioned commonly assigned copending U.S. applications and employed in the color printer of the present invention shown in FIGS. 2 and 3. The term liquid crystal was first used by O. Lehmann to identify ceratin substances that pass through a state or condition over a given temperature range between a solid crystalline state and an isotropic liquid state wherein they display rheological properties similar to that of fluids, but have optical properties similar to that of the crystalline state. Such substances which exhibit these properties may be considered as being in a fourth state of matter known as the mesomorphic state or mesophase since it is a state or phase intermediate that of the anisotropic crystal and that of the isotropic liquid.

There are three distinct mesomorphic states or forms, namely, the smectic mesophase, the nematic mesophase, and the cholesteric mesophase. A nematic liquid crystal is essentially transparent, and therefore transmits light, but when placed in a d.c. electric field the molecules of some fo these liquid crystals become disoriented so that the material diffuses light and becomes milky white in appearance. When the d.c. electric field is removed, the molecules of the liquid crystal return to their previous orientation so that the liquid crystal is again transparent. This phenomena is discussed in PROCEEDINGS OF THE I.E.E.E., for July, 1968 in an article entitled: "Dynamic Scattering: A New Electro-optical Effect in Certain Classes of Nematic Liquid Crystals," by Heilmeier, Zanoni and Barton at pp. 1162–1171.

The optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems," by Heilmeier and Goldmacher at pp. 132 and 133, in which the authors describe how a mixture of nematic and cholesteric mesomorphic materials serve as an optical storage under a d.c. or low frequency a.c. electric field, which changes the initially transparent material to a milky white light-diffusing material. The liquid crystal material remains in the light-diffusing state upon removal of the d.c. field. The mixture can be rapidly erased or changed back to a transparent state by the application of a high frequency a.c. signal greater than 700 Hz. It is this type of electro-optical action of liquid crystals that is advantageously utilized in the temporary image forming device used in my invention.

Referring now to FIG. 1 in greater detail, there is shown a photoconductor liquid crystal sandwich structure 10 which comprises spaced, first and second, transparent electrodes 12 and 14, which may be made of NESA glass, and which have spaced between them a liquid crystal layer 16 and a photoconductor layer 18 in contiguous relationship with the first and second transparent electrodes 12 and 14, respectively. A first d.c., voltage potential may be applied across the first and second transparent electrodes 12 and 14 by means of a d.c. voltage potential source 20 through the closure of the switch 22 (shown in FIG. 1 in an open, neutral position) upon a first terminal 24. Alternately, a second, a.c., voltage potential may be applied across the first and second transparency electrodes 12 and 14 by means of a.c. potential source 26 when the switch 22 is closed upon a second terminal 28.

Both the liquid crystal layer 16 and the photoconductive layer 18 are normally transparent, and when the photoconductive layer 18 is exposed to little or no light, it is electrically insulating, so that the potential drop between first and second transparent electrodes 12 and 14 is substantially entirely across photoconductive layer 18, and very little potential drop exists across liquid crystal layer 16. However, upon exposure to light, the photoconductive layer 18 becomes more conductive so that a greater portion of the potential drop is across liquid crystal 16. As stated hereinbefore, liquid crystals, particularly those of the nematic type or a combination of nematic and cholesteric materials are normally transparent, but can be made to diffuse light by applying a voltage potential across them. Therefore, as the photoconductive layer 18 becomes more conductive, liquid crystal layer 16 becomes more diffusive and therefore more opaque to transmitted light.

This and other electro-optical properties of the photoconductive liquid crystal sandwich structure 10 described hereinafter are advantageously employed in the color printer of the present invention in first, second and third temporary image forming devices to form and store temporary color separation images of the pictorial information on a positive photographic original transparency. These separation images thus effectively constitute temporary color separation internegatives of the original transparency when viewed with respective colors of light.

To form a temporary color separation image in liquid crystal layer 16, switch 22 is closed upon the first terminal 24 to connect the first, d.c., voltage potential source 20 to the first and second transparent electrodes 12 and 14 and across the liquid crystal layer 16 and photoconductive layer 18. At the same time, an original image in light of the selected color is projected in the direction of arrows 30 and 32 upon the photoconductive liquid crystal sandwich structure 10 to render photoconductive layer 18 selectively conductive in a pattern corresponding to the intensity of light transmitted by the original image. Thus, areas of the photoconductive layer 18, such as area 34, which receives a significant amount of light in the direction of arrow 30 from the original image will become conductive, so that a higher potential drop exists across the corresponding area 36 of the liquid crystal 16 than the remaining areas of the liquid crystal layer 16, causing area 36 to become light opaque or light diffusing. The remaining areas of the photoconductive layer 18 which receive little or no light, such as indicated by arrow 32, remain substantially insulative and do not change the light transmitting characteristics of the corresponding areas of the liquid crystal layer 16. Thus, the liquid crystal layer 16 has formed thereon a temporary image, that may be viewed when specular light is directed therethrough, which tends to diffuse or scatter light transmitted therethrough in the path of the arrow 38, for example, in the area 36 and tends to transmit light directed therethrough in the path of the arrow 40, for example, and the remaining areas of the liquid crystal layer 16. The temporary image of the original image formed in the photoconductor liquid crystal sandwich structure 10 of FIG. 1 is, therefore, a negative image, in the optical and photographic senses of the positive original image, since light transmitting areas of the original image are light absorbing areas in the temporary image and vice versa. The temporary image is retained in the photoconductor liquid crystal sandwich structure 10 after the switch 22 is returned to its open neutral position and the photoconductive layer 18 is no longer exposed to the original image.

The formation time for forming the temporary image can be controlled by varying the intensity of the light or radiation display of the original image and/or the time duration during which the switch is closed upon the first terminal 24 and/or the value of the first d.c. voltage potential applied to the photoconductor liquid crystal sandwich structure 10. While obviously various combinations of these factors may be utilized, exposure light intensity of the original image on the order of 1,000 foot-candles, a d.c. voltage source potential of 400 volts, and an image forming time period of 0.5 seconds have been found to be satisfactory.

The temporary image formed in the electro-optical, photoconductor liquid crystal sandwich structure 10 may be erased by closing switch 22 upon the second terminal 28, thereby applying the second a.c. voltage potential generated by a.c. voltage potential source 26 through the first and second transparent electrodes 12 and 14 and across the photoconductive layer 18 and liquid crystal layer 16. An a.c. voltage potential of 600 volts at a frequency of 1,000 Hz. applied for one to two seconds is satisfactory for this purpose, thereby rendering the liquid crystal layer 16 uniformly and highly transmissive of radiation or light.

The contrast of the visual image viewed by the transmission of light in the direction of arrows 38 and 40 through the photoconductive liquid crystal snadwich structure 10 may be reduced or increased by reducing or increasing the specularity of the viewing light source.

This electro-optical image forming, storage and erasing operation of the photoconductor liquid crystal sandwich structure 10 of FIG. 1 is essentially the same as that disclosed in the aforementioned commonly assigned U.S. application Ser. No. 81,960. As previously mentioned, this temporary image forming ability of the photoconductor liquid crystal sandwich structure 10 is advantageously employed in the color printer of the present invention, shown in FIGS. 2 and 3, to produce temporary, eraseable, (conventionally, red, green and blue) color separation internegatives of pictorial information on a positive photographic original transparency. Photosensitive material may then be additively exposed to red, green and blue light transmitted respectively through the corresponding color separation internegatives provided by the temporary images formed in the photoconductive liquid crystal sandwich structures. Because photographic printing apparatus is well known, the present description will be directed in particular to elements forming part of, or cooperating more directly with, the present invention, elements as structure not specifically shown or described herein being understood to be selectable from those known in the art.

In FIG. 2, a positive photographic original transparency 42 containing pictorial information or other original image to be reprinted is retained in a printing station by retainers 44. Photosensitive photographic color print material 46 is retained in printing station 48 by masking guides 49. By means of the present invention, temporary color separation images corresponding to red, green and blue components of the original image are formed in temporary image forming devices 50, 52 and 54 in the manner shown in FIG. 2. The temporary color separation images stored in the temporary image forming devices 50, 52 and 54 are thereafter projected in light of corresponding colors, respectively, upon the photosensitive photographic print material 46 in the manner shown in FIG. 3. Each of the temporary image forming devices 50, 52 and 54, respectively, comprises an electro-optical photosensitor liquid crystal snadwich structure 10, and the electrical circuit elements of FIG. 1.

A recording lamphouse 60 comprises a lamp 62 and lens and mirror assembly 64. The recording lamphouse 60 functions to direct a broad spectrum of radiation including radiation of first, second and third wavelengths (preferably corresponding to red, green and blue light) upon a reflective mirror 66 and through the positive original transparency 42. For example, when the positive original transparency 42 is a color slide, white light emitted by the lamp 62 is projected through the pictorial information on the color slide. A lens and mirror assembly 68 containing a recording lens 70 and an exposure lens 72 and mirror 94 is situated in a first position shown by the arrow 74 to project the radiation from the recording lamphouse 60 directed through the positive original transparency 42 upon a beam splitter 76. The beam splitter 76 may comprise a pair of dichroic filters set at 90° with respect to each other which direct the red, green and blue components of the light onto the respective temporary image forming devices 50, 52 and 54. Thus, first, second and third color images of the pictorial information are projected by the recording lens assembly 70 and the beam splitter 76 upon the corresponding photoconductor liquid crystal sandwich structures 10 of the temporary image forming and storing devices 50, 52 and 54. The path of the radiation from the recording lamphouse 60 to the temporary image forming and storing devices 50, 52 and 54 is shown in FIG. 2, in the first mode of operation of the color printer of the present invention, by the direction of the arrows in the recording beam 78.

At the same time, the switches 22 are closed on the first terminals 24 to apply the first d.c. voltage potential from the d.c. voltage potential source 20 across the photoconductor liquid crystal snadwich structures 10 of the temporary image forming devices 50, 52 and 54. In the manner described with respect to FIG. 1, the photoconductor liquid crystal sandwich structures 10 store a negative or reverse temporary color separation image of the original image directed thereon. Thus, the red colors in the original image on the positive photographic original transparency 42 are directed by the red reflecting dichroic filter of beam splitter 76 to the photoconductor liquid crystal sandwich structure 10 of temporary image forming device 50 which reacts thereto to store a first temporary color separation image of the original image. This temporary image therefore effectively constitutes a temporary red color separation internegative when it is viewed by transmitted red light. Likewise, the green and blue light in the original image are directed by the green transmitting and blue reflecting dichroic filters of beam splitter 76 to the photoconductor liquid crystal sandwich structures 10 of the second and third temporary image forming devices 52 and 54, respectively, to produce green and blue color separation internegatives of the original image on the positive photographic original transparency 42. The temporary images, corresponding to red, green and blue color separation internegatives, may be stored for an indefinite time after the lamp 62 of the exposure lamphouse is turned off and the switches 22 of the temporary image forming devices 50, 52 and 54, respectively, are returned to the open neutral position shown in FIG. 1.

Referring now to FIG. 3, the novel color printer of the present invention is shown operating in its second mode wherein the temporary color separation images are projected upon the photosensitive photographic color print material 46 located in the printing position 48 through the operation of red, green and blue exposure lamphouses 80, 82 and 84, respectively, and the movement of the lens housing 68 into the second position indicated by the arrow 86. The red, green and blue exposure lamphouses 80, 82 and 84, respectively, may each comprise a lamp 88, rotatable dark shutter 90, an appropriate color filter and diffuser 91 and a projection lens assembly 92. A mirror 94 is associated with exposure lens 72 of lens assembly 68 for movement therewith in the direction of the arrows 74 (FIG. 2) and 86. Light projected through exposure lens 72 is reflected by mirror 94 onto a mirror 96 which reflects the light upon the photosensitive photographic color print material 46 located in the exposure station 48.

The color printer of the present invention operates in the second mode shown in FIG. 3 as follows. The temporary color separation images formed in the electro-optical image forming and storing devices 50, 52 and 54 in the manner described hereinbefore with respect to FIGS. 1 and 2, have been stored thereon by movement of the switches 22 to the open neutral positions shown in FIG. 3. Thereafter, the dark shutters 90 in the red, green and blue projection lamphouses 80, 82 and 84 are moved from the position shown in FIG. 2 to the position shown in FIG. 3, and the lamps 88 are energized to emit filtered specular light of the corresponding colors that are projected by projection lens assemblies 92 through the first, second and third temporary images, respectively. The illuminated temporary color separation images are directed onto the beam splitter 76. The color filters and diffusers 91 insure that the temporary images constitute red, green and blue color separation internegatives, respectively, of the positive photographic transparency 42 at the proper contrast for photographic reproduction. It will be understood that the contrasts of each color separation image may be varied by adjustment of the filters and diffusers 91 to change the specularity of the light.

The beamsplitter 76 cooperates with the exposure lens 72 and mirrors 94 and 96 to expose the photosensitive photographic color print material 46 to a reverse or negative full color image of the positive transparency as shown in FIG. 3 by the path of the exposure printing beam 98. The resulting latent image when, conventionally color processed, will constitute a full color reproduction of the original transparency.

The photographic color print material 46 is exposed to red, green and blue light transmitted through the respective temporary images for finite exposure times which may be calculated and manually controlled by the operator of the color printer of the present invention or which may be automatically controlled by transmission density photosensors as shown, for example, in my U.S. Pat. No. 3,184,307. The transmission densities of the temporary color separation images of internegatives may be separately determined before or during the exposure times of the photosensitive material 46 by appropriate photosensors situated with respect to the path of the projection beam 98 to develop first, second and third exposure times dependent upon the intensities of the red, green and blue light transmitted by the respective first, second and third temporary images. Alternately corrective color filters may be added in the exposure color lamphouses 80, 82 and 84 to correct the color balance of each color separation image and provide a uniform printing time.

After exposure of the photosensitive photographic color print material 46 is complete, the shutters 90 are rotated into the projection path in each of the red, green and blue projection lamphouses 80, 82 and 84, respectively, the lamps 88 are extinguished and, unless a second print is to be made, the switch 22 is closed upon the second terminal 28 in a manner described hereinbefore to apply the second, a.c. voltage potential across the photoconductive liquid crystal sandwich structure 10 to erase the temporary images. At the same time, the lens assembly 68 and the mirror 94 may be moved in the direction of arrows 74 and an unexposed portion of the photosensitive photographic color print material 46 may be advanced into the printing station 48, so that the original image on another positive photographic original transparency 42 may be recorded in temporary color separation images and printed in a manner described hereinbefore with respect to FIGS. 2 and 3.

Although the invention is of particular value in the production of photographic prints from positive photographic original transparencies, it should be apparent that it may encompass the production of duplicate transparencies from either a positive or a negative photographic original transparency. And, it will be apparent that other photosensitive materials may be substituted for the photographic color print material 46 to form images useful in electro-photography, xerography, or the like. For example, in three color xerographic reproductions (as shown, for example, in U.S. Pat. No. 3,531,195) of the pictorial information on a color negative, the three positive color separation images of the pictorial information may be simultaneously stored in the three respective electro-optical image forming devices (or sequentially stored in a single electro-optical image forming device) and three separate areas of a xerographic drum may be sequentially exposed to the three positive color separation images. Three toner colors may then be applied to the three exposed areas of the drum, and paper may be imprinted with the toner to produce a positive color representation of the pictorial information on the color negative.

The invention has been described in detail with particular reference to preferred embodiments thereof, but it will be understood that variations and modifications can be effected within the spirit and scope of the invention.

I claim:

1. The method of printing color pictorial information carried by a positive color original transparency containing positive color pictorial information on photosensitive color print material utilizing intermediate image storage photoconductor-liquid crystal sandwich structures, each of which include in order, a first transparent electrode, a transparent photoconductor layer, a liquid crystal layer of a mixture of nematic and cholesteric liquid crystal material, and a second transparent electrode, the method comprising the steps of:
   a. illuminating said pictorial information on said color original transparency with red, green and blue light, whereby red, green and blue images of the pictorial information are transmitted by said color original transparency;
   b. exposing first, second and third respective photoconductor-liquid crystal sandwich structures to the red, green and blue light images, respectively, of said color pictorial information;
   c. applying a first electrical signal across said photoconductor-liquid crystal sandwich structures substantially simultaneously with the exposure of said photoconductor-liquid crystal sandwich structures to said red, green and blue light images, respectively, whereby first, second and third respective light transmissive temporary negative images corresponding to the red, green and blue light images, respectively, are formed in said respective photoconductor-liquid crystal sandwich structures;
   d. removing the first electrical signal from said photoconductor-liquid crystal sandwich structures to store said first, second and third temporary negative images, respectively, therein;
   e. illuminating said first, second and third temporary negative images in said respective first, second and third photoconductor-liquid crystal sandwich structures with red, green and blue light, respectively; and
   f. exposing photosensitive material to the red, green and blue light transmitted by the first, second and third photoconductor-liquid crystal sandwich structures, respectively, whereby the first, second and third temporary negative images are projected in color onto said photosensitive material.

2. The method of claim 1 wherein the photosensitive materail is additively exposed to the first, second and third temporary images in mutual superimposition.

3. Apparatus for printing pictorial information carried by an original on photosensitive material, said apparatus comprising:
   a. means for illuminating said pictorial information on said original with first and second wavelengths of radiation;
   b. photoconductor-liquid crystal sandwich structures responsive to a radiation pattern and a first electrical signal for forming and storing a temporary image of the radiation pattern, said photoconductor-liquid crystal sandwich structures each including, in order, a first transparent electrode, a transparent photoconductor layer, a liquid crystal layer of a mixture of nematic and cholesteric liquid crystal material, and a second transparent electrode;
   c. means for exposing said photoconductor-liquid crystal sandwich structures to radiation patterns of the first and second wavelengths conforming to said illuminated pictorial information on said original, and means for substantially simultaneously applying the first electrical signal to said photoconductor-liquid crystal sandwich structures, whereby first and second temporary images corresponding to radiation patterns of the first and second wavelengths are formed in said photoconductor-liquid crystal sandwich structures;
   d. removing the first signal from said photoconductor-liquid crystal sandwich structures to store said first and second temporary images, respectively, therein; and
   e. means for illuminating said first and second temporary images with first and second wavelengths of radiation, respectively, and for exposing photosensitive material to the first and second wavelengths of radiation from said illuminated first and second temporary images.

4. The apparatus of claim 3 wherein the photosensitive material is additively exposed to the first and second temporary images in mutual superimposition.

5. The apparatus of claim 3 further comprising means for applying a second electrical signal across said photoconductor-liquid crystal sandwich structures to erase said first and second temporary images.

6. Apparatus for printing color pictorial information carried by a color original transparency on photosensitive material, said apparatus comprising:
   a. means for illuminating said color pictorial information on said color original transparency with red, green and blue light, whereby red, green and blue images of said color pictorial information are transmitted by said color original transparency;
   b. first, second and third photoconductor-liquid crystal sandwich structures, said photoconductor-liquid crystal sandwich structures each including, in order, a first transparent electrode, a transparent photoconductor layer, a liquid crystal layer of a mixture of nematic and cholesteric liquid crystal material, and a second transparent electrode each of said photoconductor-liquid crystal sandwich structures being responsive to a first electrical signal and light images incident thereon to form a temporary radiation transmissive image;

c. means for exposing said first, second and third respective photoconductor-liquid crystal sandwich structures to the red, green, and blue light images, respectively, of said color pictorial information on said color original transparency and means for substantially simultaneously applying a first electrical signal across said photoconductor-liquid crystal sandwich structures, whereby first, second and third respective radiation transmissive temporary images corresponding to the red, green and blue light images, respectively, are formed in said respective photoconductor-liquid crystal sandwich structures;

d. means for removing the first electrical signal from said photoconductor-liquid crystal sandwich structures to store said first, second and third temporary images, respectively, therein; and e. means for illuminating said first, second and third temporary images with red, green and blue light, respectively, and for exposing photosensitive material to the red, green and blue light transmitted by the first, second and third photoconductor liquid crystal sandwich structures, respectively, whereby the first, second and third temporary images are projected in color onto said photosensitive material.

7. The apparatus of claim 6 wherein the photosensitive material is photosensitive color print material and said photosensitive material exposing means is operative to additively expose said photosensitive color print material to the red, green and blue light transmitted through the first, second and third temporary images, respectively, in mutual superimposition to produce a color representation of the pictorial information on said color original transparency.

8. The apparatus of claim 6 wherein the color original transparency is a positive color original transparency containing positive color pictorial information, said first, second and third temporary images are negative images of the positive color pictorial information, and said photosensitive material comprises photosensitive color print material, whereby the exposure of the photosensitive color print material to the red, green and blue light transmitted through the first, second and third temporary negative images results, after development of the photosensitive color print material, in a positive color representation of the positive color pictorial information.

9. The apparatus of claim 6 further comprising means for applying a second electrical signal across said photconductor-liquid crystal sandwich structures to erase said first, second and third temporary images.

10. The apparatus of claim 6 wherein said means for illuminating said photoconductor-liquid crystal sandwich structures further comprises means for altering the contrast of the first, second and third temporary images by controlling the specularity of the red, green and blue light transmitted through the first, second and third temporary images, respectively.

11. The apparatus of claim 6 wherein said photographic original transparency comprises a color negative carrying negative color pictorial information, said first, second and third temporary images constitute positive images of the negative color pictorial information, and said photosensitive material responds to red, green and blue light transmitted through the first, second and third positive temporary images to form first, second and third negative color representations of said negative color pictorial information.

12. The method of printing pictorial information carried by a negative color original transparency containing negative color pictorial information on photosensitive color print material utilizing intermediate image storage photoconductor-liquid crystal sandwich structures, each of which include in order, a first transparent electrode, a transparent photoconductor layer, a liquid crystal layer of a mixture of nematic an cholesteric liquid crystal material, and a second transparent electrode, the method comprising the steps of:

a. illuminating said pictorial information on said color original transparency with red, green and blue light, whereby red, green and blue images of the pictorial information are transmitted by said color original transparency;

b. exposing first, second and third respective photoconductor-liquid crystal sandwich structures to the red, green and blue light images, respectively, of said color pictorial information;

c. applying a first electrical signal across said photoconductor-liquid crystal sandwich structures substantially simultaneously with the exposure of said photoconductor-liquid crystal sandwich structures to said red, green and blue light images, respectively, whereby first, second and third respective light transmissive temporary positive images corresponding to the red, green and blue light images, respectively, are formed in said respective photoconductor-liquid crystal sandwich structures;

d. removing the first electrical signal from said photoconductor-liquid crystal sandwich structures to store said first, second and third temporary positive images, respectively, therein:

e. illuminating said first, second and third temporary positive images in said respective first, second and third photoconductor-liquid crystal sandwich structures with red, green and blue light, respectively; and f. exposing photosensitive material to the red, green and blue light transmitted by the first, second and third photoconductor-liquid crystal sandwich structures, respectively, whereby the first, second and third temporary positive images are projected in color onto said photosensitive material, and said photosensitive material responds to said first and second and third positive color transparency images to form first, second and third negative color representations of said negative color pictorial information.

* * * * *